(12) United States Patent
Haka et al.

(10) Patent No.: US 11,639,094 B2
(45) Date of Patent: May 2, 2023

(54) DISTRIBUTED DRIVETRAIN ARCHITECTURES FOR COMMERCIAL VEHICLES WITH A HYBRID ELECTRIC POWERTRAIN AND DUAL RANGE DISCONNECT AXLES

(71) Applicant: Dana Heavy Vehicle Systems Group, LLC, Maumee, OH (US)

(72) Inventors: Raymond J. Haka, Brighton, MI (US); Krishna Kumar, West Bloomfield, MI (US); Steven J. Wesolowski, Waterville, OH (US); James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/225,881

(22) Filed: Apr. 8, 2021

(65) Prior Publication Data
US 2021/0221214 A1 Jul. 22, 2021

Related U.S. Application Data

(63) Continuation of application No. 15/781,807, filed as application No. PCT/US2016/065285 on Dec. 7, 2016, now Pat. No. 11,001,134.
(Continued)

(51) Int. Cl.
*B60K 6/52* (2007.10)
*B60K 6/442* (2007.10)
(Continued)

(52) U.S. Cl.
CPC .............. *B60K 6/442* (2013.01); *B60K 6/365* (2013.01); *B60K 6/445* (2013.01); *B60K 6/52* (2013.01);
(Continued)

(58) Field of Classification Search
CPC ........ B60K 6/442; B60K 6/365; B60K 6/445; B60K 6/52; B60K 17/36; B60K 17/3515;
(Continued)

(56) References Cited

U.S. PATENT DOCUMENTS 1,117,700 A 11/1914 Piggins
1,258,946 A 3/1918 Russel
(Continued)

FOREIGN PATENT DOCUMENTS

CN 202641356 U * 1/2013
DE 102005062874 A1 7/2007
(Continued)

OTHER PUBLICATIONS

ISA European Patent Office, International Search Report and Written Opinion Issued in Application No. PCT/US2016/065285, dated Mar. 20, 2017, WIPO, 14 pages.

*Primary Examiner* — Roger L Pang
(74) *Attorney, Agent, or Firm* — McCoy Russell LLP

(57) ABSTRACT

A hybrid drivetrain is provided. The hybrid drivetrain comprises a power source, a transmission, and a tandem axle assembly. The transmission includes a primary clutch and is drivingly engaged with the power source. The tandem axle assembly includes a first axle and a second axle and is drivingly engaged with the transmission. One of the transmission and the tandem axle assembly includes a first motor generator in electrical communication with a battery. The first motor generator and the primary clutch facilitate operating the hybrid drivetrain as a hybrid drivetrain in a plurality of operating modes. The hybrid drivetrain may further comprise second and third motor generators in electrical communication with the battery to facilitate operating the hybrid drivetrain in a plurality of operating modes.

14 Claims, 10 Drawing Sheets

Related U.S. Application Data

(60) Provisional application No. 62/406,126, filed on Oct. 10, 2016, provisional application No. 62/264,089, filed on Dec. 7, 2015.

(51) Int. Cl.

| | | |
|---|---|---|
| *B60K 6/365* | (2007.10) | |
| *B60K 6/445* | (2007.10) | |
| *B60K 17/16* | (2006.01) | |
| *B60K 17/35* | (2006.01) | |
| *B60K 17/36* | (2006.01) | |
| *F16H 3/72* | (2006.01) | |
| *F16H 48/05* | (2012.01) | |
| *F16H 48/24* | (2006.01) | |
| *B60W 10/08* | (2006.01) | |
| *B60W 20/10* | (2016.01) | |
| *B60W 10/02* | (2006.01) | |
| *B60W 10/06* | (2006.01) | |
| *B60K 6/387* | (2007.10) | |
| *B60K 6/547* | (2007.10) | |

(52) U.S. Cl.
CPC ........ *B60K 17/165* (2013.01); *B60K 17/3515* (2013.01); *B60K 17/36* (2013.01); *B60W 10/02* (2013.01); *B60W 10/06* (2013.01); *B60W 10/08* (2013.01); *B60W 20/10* (2013.01); *F16H 3/727* (2013.01); *F16H 3/728* (2013.01); *F16H 48/05* (2013.01); *F16H 48/24* (2013.01); *B60K 6/387* (2013.01); *B60K 6/547* (2013.01); *B60Y 2200/92* (2013.01); *B60Y 2400/73* (2013.01)

(58) Field of Classification Search
CPC ...... B60W 10/02; B60W 10/06; B60W 10/08; B60W 20/10; B60W 20/40; F16H 3/727; F16H 48/05; B60Y 2400/73
USPC ............................................................ 477/5
See application file for complete search history.

(56) References Cited

U.S. PATENT DOCUMENTS

| | | | |
|---|---|---|---|
| 1,373,142 A | 3/1921 | Midboe | |
| 1,421,836 A | 7/1922 | Russel | |
| 2,689,015 A | 9/1954 | Nallinger | |
| 3,799,284 A | 3/1974 | Hender | |
| 5,168,946 A | 12/1992 | Dorgan | |
| 5,188,195 A | 2/1993 | Haustein | |
| 5,718,300 A | 2/1998 | Frost | |
| 5,845,731 A | 12/1998 | Buglione et al. | |
| 6,295,847 B1 | 10/2001 | Zeren | |
| 6,644,427 B2 | 11/2003 | Schulte | |
| 6,740,002 B1 | 5/2004 | Stridsberg | |
| 6,953,408 B2 | 10/2005 | Thompson | |
| 7,028,583 B2 | 4/2006 | Bennett | |
| 7,174,978 B2 | 2/2007 | Taniguchi et al. | |
| 7,255,187 B2 | 8/2007 | Bell et al. | |
| 7,410,017 B2 | 8/2008 | Gradu | |
| 7,497,286 B2 | 3/2009 | Keller et al. | |
| 7,520,354 B2 | 4/2009 | Morrow et al. | |
| 7,742,852 B1 | 6/2010 | Tang | |
| 7,866,423 B2 | 1/2011 | Ruppert et al. | |
| 7,959,534 B2 | 6/2011 | Kasuga et al. | |
| 8,011,461 B2 | 9/2011 | Rodriguez et al. | |
| 8,944,194 B2 | 2/2015 | Glaser et al. | |
| 9,062,744 B2 | 6/2015 | Valente et al. | |
| 9,162,586 B2 | 10/2015 | Tang | |
| 9,387,753 B2 * | 7/2016 | Parenti .................. | F16H 37/046 |
| 9,505,304 B1 | 11/2016 | McCoy et al. | |
| 2003/0111280 A1 | 6/2003 | Platner et al. | |
| 2003/0205422 A1 | 11/2003 | Morrow et al. | |
| 2004/0050597 A1 | 3/2004 | Ai et al. | |
| 2005/0109549 A1 | 5/2005 | Morrow | |
| 2005/0151420 A1* | 7/2005 | Crombez ................. | B60K 6/44 903/947 |
| 2007/0038340 A1 | 2/2007 | Sekiguchi et al. | |
| 2009/0205422 A1 | 8/2009 | Caron et al. | |
| 2009/0242289 A1 | 10/2009 | Murty | |
| 2009/0321153 A1 | 12/2009 | Boeckenhoff et al. | |
| 2010/0282530 A1 | 11/2010 | Wang et al. | |
| 2011/0120788 A1 | 5/2011 | Wang et al. | |
| 2011/0259657 A1 | 10/2011 | Fuechtner | |
| 2013/0005529 A1* | 1/2013 | Chen ........................ | B60K 6/54 475/5 |
| 2013/0035838 A1* | 2/2013 | Maier ..................... | B60K 6/52 701/99 |
| 2013/0150197 A1 | 6/2013 | Lee et al. | |
| 2014/0116793 A1 | 5/2014 | Pelletier et al. | |
| 2015/0211616 A1 | 7/2015 | Yang et al. | |
| 2016/0091059 A1 | 3/2016 | Boulet et al. | |
| 2018/0134300 A1* | 5/2018 | Anschuber ...... | B60W 30/18136 |

FOREIGN PATENT DOCUMENTS

| | | |
|---|---|---|
| DE | 102014103485 A1 | 9/2014 |
| EP | 1232892 A2 | 8/2002 |
| EP | 2574490 A2 | 4/2013 |
| EP | 2574491 A1 | 4/2013 |
| EP | 2705968 A1 | 3/2014 |
| EP | 2902234 A1 | 8/2015 |
| EP | 2927036 A1 | 10/2015 |
| FR | 2746352 A1 | 9/1997 |
| FR | 2864191 A1 | 6/2005 |
| JP | 2000032610 A * | 1/2000 |
| JP | 2007131849 A | 5/2007 |
| JP | 2012007030 A | 1/2012 |
| JP | 2012007030 A | 1/2012 |
| WO | 2005081930 A2 | 9/2005 |

* cited by examiner

DISTRIBUTED DRIVETRAIN ARCHITECTURES FOR COMMERCIAL VEHICLES WITH A HYBRID ELECTRIC POWERTRAIN AND DUAL RANGE DISCONNECT AXLES

CLAIM OF PRIORITY

The present application is a continuation of U.S. patent application Ser. No. 15/781,807, entitled "DISTRIBUTED DRIVETRAIN ARCHITECTURES FOR COMMERCIAL VEHICLES WITH A HYBRID ELECTRIC POWERTRAIN AND DUAL RANGE DISCONNECT AXLES," and filed on Jun. 6, 2018. U.S. patent application Ser. No. 15/781,807 is a national phase of International Patent Application No. PCT/US2016/065285, filed on Dec. 7, 2016. International Patent Application No. PCT/US2016/065285 claims priority to U.S. Provisional Patent Application No. 62/406,126, filed on Oct. 10, 2016, and U.S. Provisional Patent Application No. 62/264,089, filed on Dec. 7, 2015. The entire contents of the above-listed applications are hereby incorporated by reference for all purposes.

FIELD OF THE INVENTION

The present application relates to drivetrains for commercial vehicles and more particularly to hybrid electric drivetrains for commercial vehicles.

BACKGROUND OF THE INVENTION

Commercial vehicles or trailers having two or more rear axles allow such vehicles to carry greater loads when compared to vehicles and trailers having a single axle. Further, tractive effort and load distribution can be increased in these vehicles.

Hybrid powertrains incorporate a second power source, such as a motor-generator and a battery, that can be used to increase an efficiency of a drivetrain. Currently, few options for hybridized drivetrains for commercial vehicles are available. Because of the unique demands of commercial vehicles, such as the need for a low speed, high torque mode of operation while also having a high speed, low torque mode of operation, many challenges exist in successfully implementing a hybridized drivetrain for use with commercial vehicles. Further, regulations posed by governments increasingly demand fuel efficiency improvements for such vehicles.

It would be advantageous to develop a hybridized drivetrain for commercial vehicles that meets the exacting needs of commercial vehicles while providing fuel efficiency improvements for vehicles incorporating the hybridized drivetrain.

SUMMARY OF THE INVENTION

Presently provided by the application, a hybridized drivetrain for commercial vehicles that meets the exacting needs of commercial vehicles while providing fuel efficiency improvements for vehicles incorporating the hybridized drivetrain, has surprisingly been discovered.

In one embodiment, the present application is directed to a hybrid drivetrain. The hybrid drivetrain comprises a power source, a transmission, and a tandem axle assembly. The transmission includes a primary clutch and is drivingly engaged with the power source. The tandem axle assembly includes a first axle and a second axle and is drivingly engaged with the transmission. One of the transmission and the tandem axle assembly includes a first motor generator in electrical communication with a battery. The first motor generator and the primary clutch facilitate operating the hybrid drivetrain as a hybrid drivetrain in a plurality of operating modes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Various aspects of this application will become apparent to those skilled in the art from the following detailed description of the described embodiments, when read in light of the accompanying drawings.

BRIEF DESCRIPTION OF THE DRAWINGS

The above, as well as other advantages of the present application, will become readily apparent to those skilled in the art from the following detailed description when considered in the light of the accompanying drawings in which.

DETAILED DESCRIPTION

It is to be understood that the application may assume various alternative orientations and step sequences, except where expressly specified to the contrary. It is also to be understood that the specific devices and processes illustrated in the attached drawings, and described in the following specification are simply exemplary embodiments of the inventive concepts of the present application. Hence, specific dimensions, directions, orientations or other physical characteristics relating to the embodiments disclosed are not to be considered as limiting, unless expressly stated otherwise.

Figure 1:
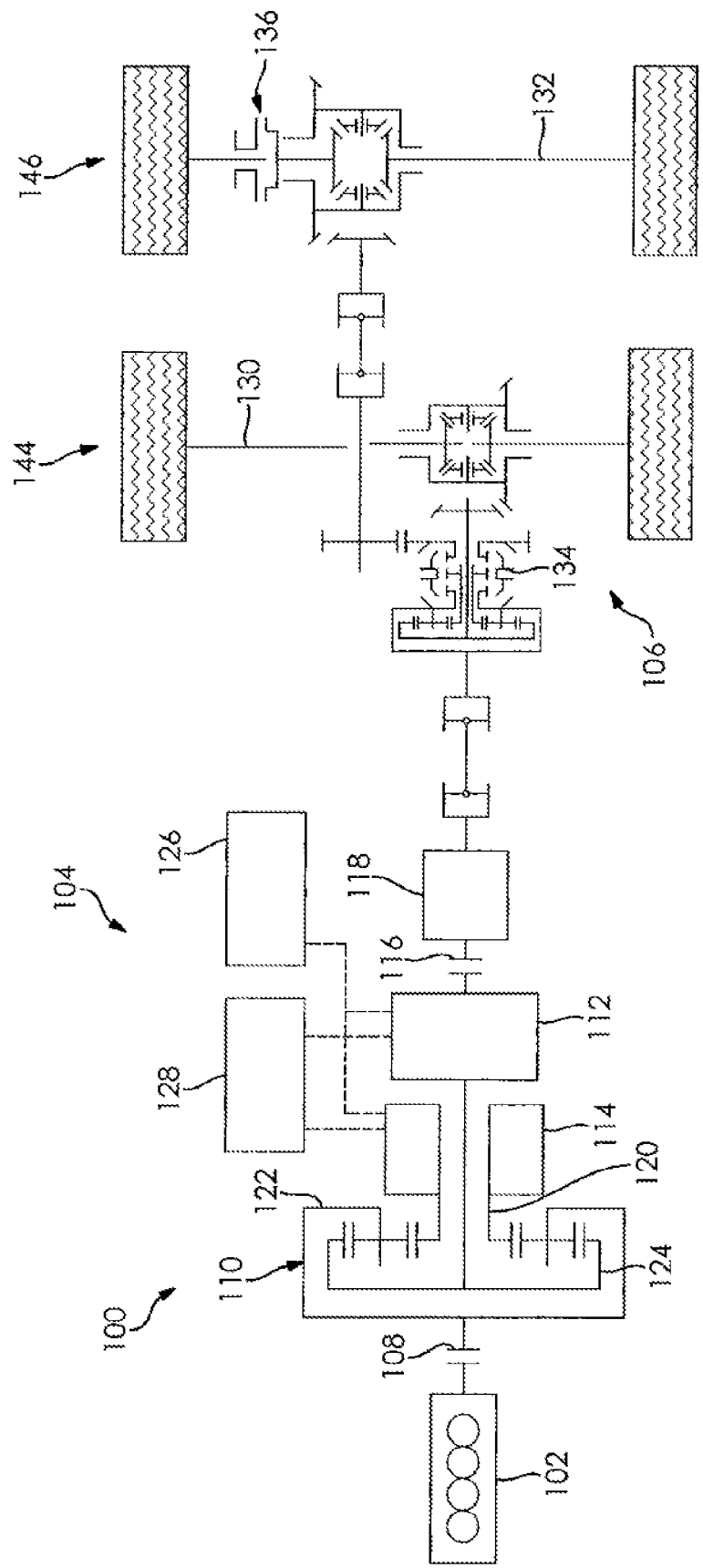
FIG. 1 is a schematic style view of a hybrid drivetrain according to a first embodiment of the application.

FIG. 1 is a schematic style view of a hybrid drivetrain 100 according to a first embodiment of the application. The hybrid drivetrain 100 includes a power source 102, a hybrid transmission 104, and a tandem axle drive unit 106, the tandem drive axle unit 106 including a first axle drive unit 144 and a second axle drive unit 146. The power source 102 is drivingly engaged with an input of the hybrid transmission 104. The tandem axle drive unit 106 is drivingly engaged with an output of the hybrid transmission 104.

The power source 102 is an internal combustion engine, however, it is understood that the power source 102 may also be a hybrid type power source incorporating a secondary power source in addition to an internal combustion engine. Further, it is understood that the power source 102 may also be a source of electrical power, such as a fuel cell. The hybrid transmission 104 includes a primary clutch 108, a planetary gearset 110, a first motor-generator 112, a second motor-generator 114, a secondary clutch 116, and a gear box 118. A portion of the primary clutch 108 acts as the input for the hybrid transmission 104. A portion of the gear box 118 acts as the output for the hybrid transmission 104. The primary clutch 108, the first motor-generator 112, and second motor-generator 114 are in driving engagement with portions of the planetary gearset 110. The secondary clutch 116 is in driving engagement with the first motor-generator 112 and the gear box 118.

The primary clutch 108 is a clutch which can be variably engaged, such as a plate or cone style clutch.

The planetary gearset 110 comprises a sun gear portion 120, a carrier portion 122, and a ring gear portion 124. The sun gear portion 120 is in driving engagement with the second motor-generator 114. The carrier portion 122 is in driving engagement with a portion of the primary clutch 108. The ring gear portion 24 is in driving engagement with the first motor-generator 112. It is understood that the planetary gearset 110 may have other configurations that facilitate a similar operation; in which torques applied by the power source 102 and the second motor generator 114 may be summed and applied to the first motor generator 112.

The first motor generator 112 is in driving engagement with the ring gear portion 124 of the planetary gearset 110 and the secondary clutch 116. The first motor generator 112 is in electrical communication with a controller 126 and a battery 128. It is understood that the first motor generator 112, or any of the other motor generators described herein, may be incorporated into a gearbox, transmission, or other driveline component of the hybrid drivetrain 100. Depending on an electrical control of the first motor generator 112 using the controller 126, the first motor generator 112 may apply a driving force to propel or retard a portion of the hybrid drivetrain 100 it is drivingly engaged with.

The second motor generator 114 is in driving engagement with the sun gear portion 120 of the planetary gearset 110 and the secondary clutch 116. The second motor generator 1 4 is in electrical communication with the controller 126 and the battery 128. It is understood that the second motor generator 114, or any of the other motor generators described herein, may be incorporated into a gearbox, transmission, or other driveline component of the hybrid drivetrain 100. Depending on an electrical control of the second motor generator 114 using the controller 126, the first motor generator 112 may apply a driving force to propel or retard a portion of the hybrid drivetrain 100 it is drivingly engaged with.

The secondary clutch 116 is a clutch which can be variably engaged, such as a plate or cone style clutch.

The gear box 118 is a multi-speed gearbox in driving engagement with the secondary clutch 116 and the tandem axle drive unit 106. The gear box 18 may be manually or automatically operated.

The tandem axle drive unit 06 is drivingly engaged with the gear box 118, a first axle 130, and a second axle 132. The tandem axle drive unit 106 is configured to be placed in two modes of operation, depending on a position of a selection clutch 134. In a first mode of operation, the tandem axle drive unit 106 operates in a high torque, dual axle mode operation. In a second mode of operation, the tandem axle drive unit 106 operates in a low torque, single axle mode operation. As shown in FIG. 1, the hybrid driveline 100 includes an optional axle disconnect clutch 136. The tandem axle drive unit 106 is similar in structure and functionality to the planetary drive unit 716 shown in FIG. 7, described hereinbelow.

In use, through control of the primary clutch 108 and the secondary clutch 116, driving and charging can occur with and without engagement with the rest of the hybrid drivetrain 100. The hybrid drivetrain 100 is a series-parallel hybrid drivetrain, and may be operated in a plurality of operating modes as described hereinbelow. The first motor generator 112 is placed inline in the hybrid drivetrain 100, and the second motor generator 114 can be used to supplement the hybrid drivetrain 100 through the planetary gearset 110. The motor generators 12, 114 provide the following benefits: engine downsizing, efficiency improvement by operating the power source 102 within a narrower band (allowing the second motor generator 114 to provide acceleration flexibility), reduced gearing in the gearbox 118, and a downsizing of the axles 130, 132.

Figure 2:
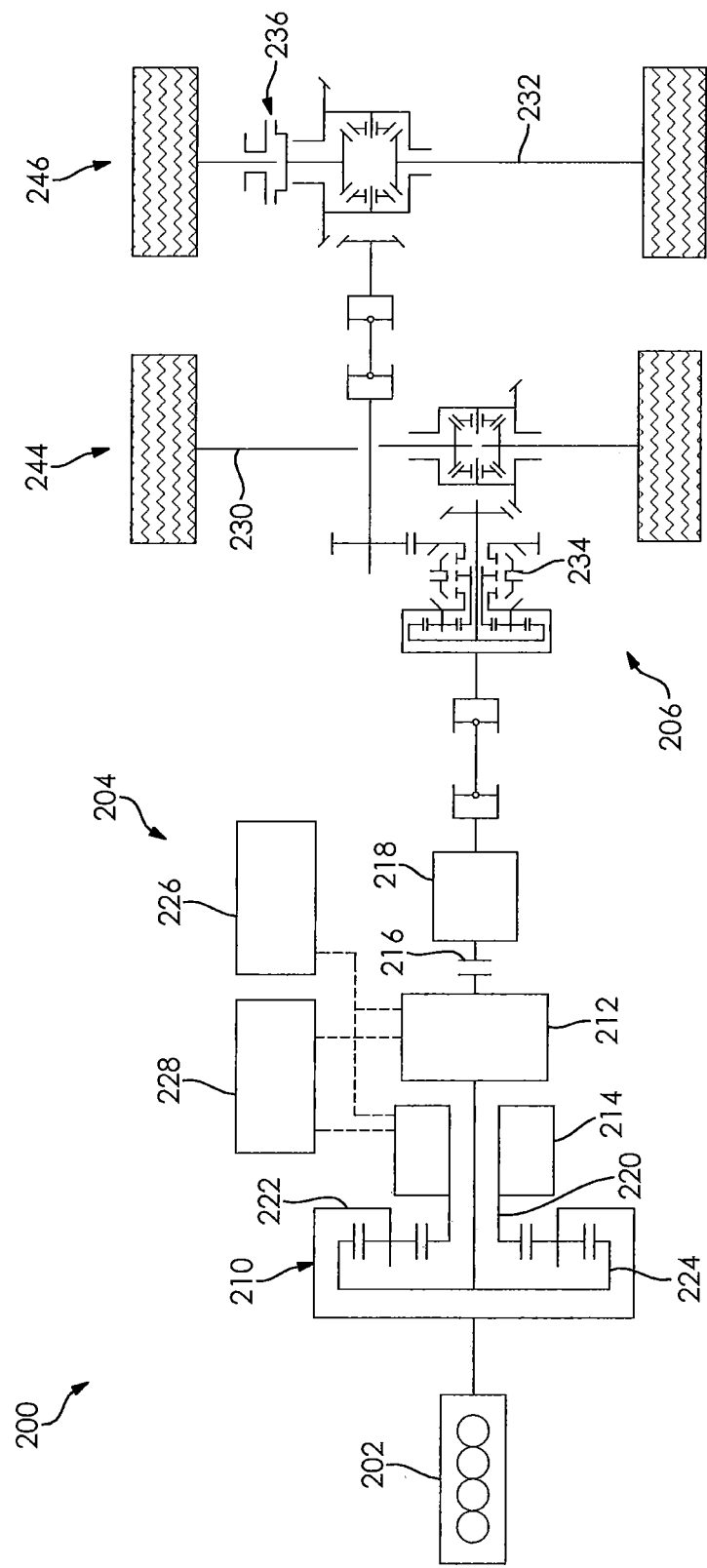
FIG. 2 is a schematic style view of a hybrid drivetrain according to another embodiment of the application.

FIG. 2 is a schematic style view of a hybrid drivetrain 200 according to another embodiment of the application. The hybrid drivetrain 200 includes a power source 202, a hybrid transmission 204, and a tandem axle drive unit 206, the tandem axle drive unit 206 including a first axle drive unit 244 and a second axle drive unit 246. The power source 202 is drivingly engaged with an input of the hybrid transmission 204. The tandem axle drive unit 206 is drivingly engaged with an output of the hybrid transmission 204. The hybrid drivetrain 200 is similar to the hybrid drivetrain 100 shown in FIG. 1, with the exception that the hybrid drivetrain 200 shown in FIG. 2 does not include the primary clutch 108. The clutch 216 facilitates disengaging the gear box 218 from the first motor generator 212.

Figure 3:
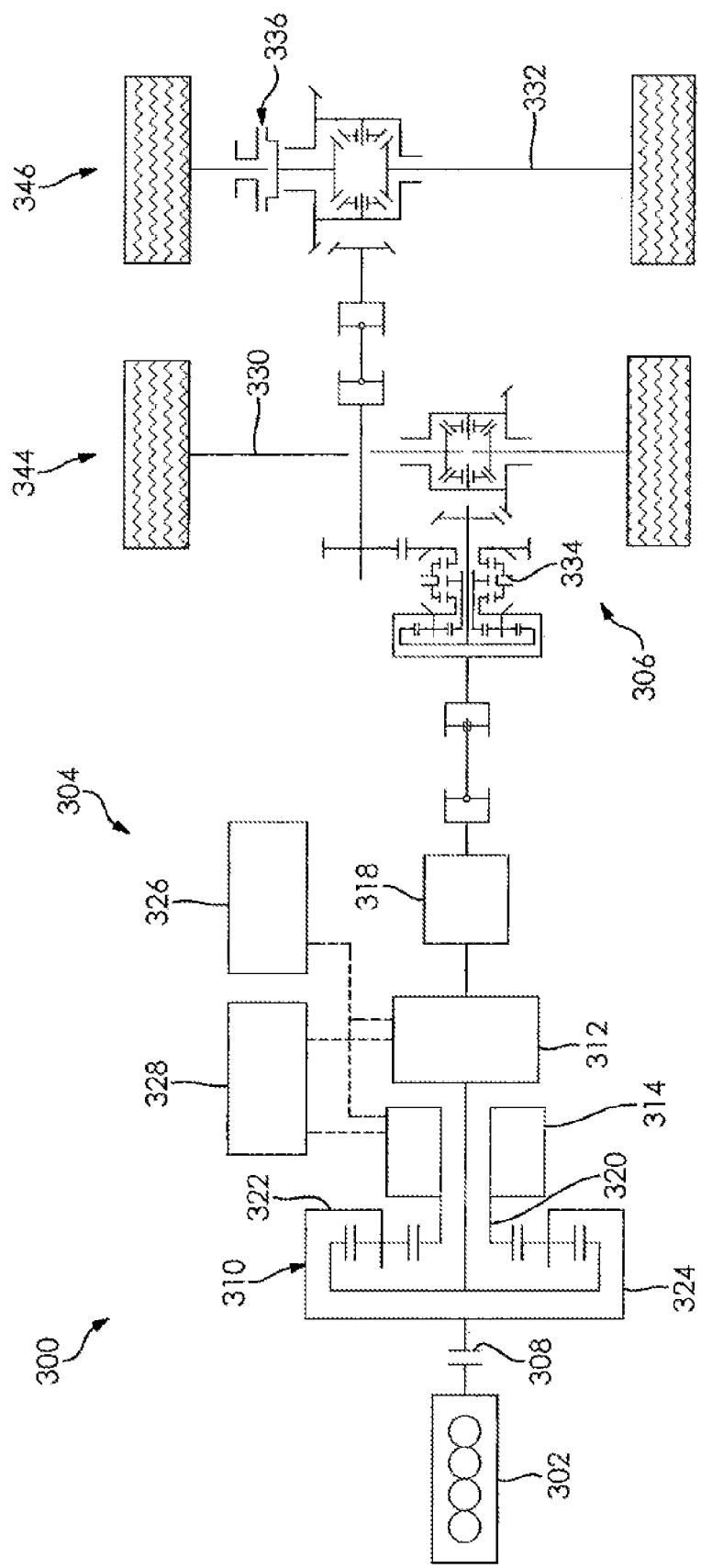
FIG. 3 is a schematic style view of a hybrid drivetrain according to another embodiment of the application.

FIG. 3 is a schematic style view of a hybrid drivetrain 300 according to another embodiment of the application. The hybrid drivetrain 300 includes a power source 302, a hybrid transmission 304, and a tandem axle drive unit 306, the tandem axle drive unit 306 including a first axle drive unit 344 and a second axle drive unit 346. The power source 302 is drivingly engaged with an input of the hybrid transmission 304. The tandem axle drive unit 306 is drivingly engaged with an output of the hybrid transmission 304. The hybrid drivetrain 300 is similar to the hybrid drivetrain 100 shown in FIG. 1, with the exception that the hybrid drivetrain 300 shown in FIG. 3 does not include the secondary clutch 116.

Figure 4:
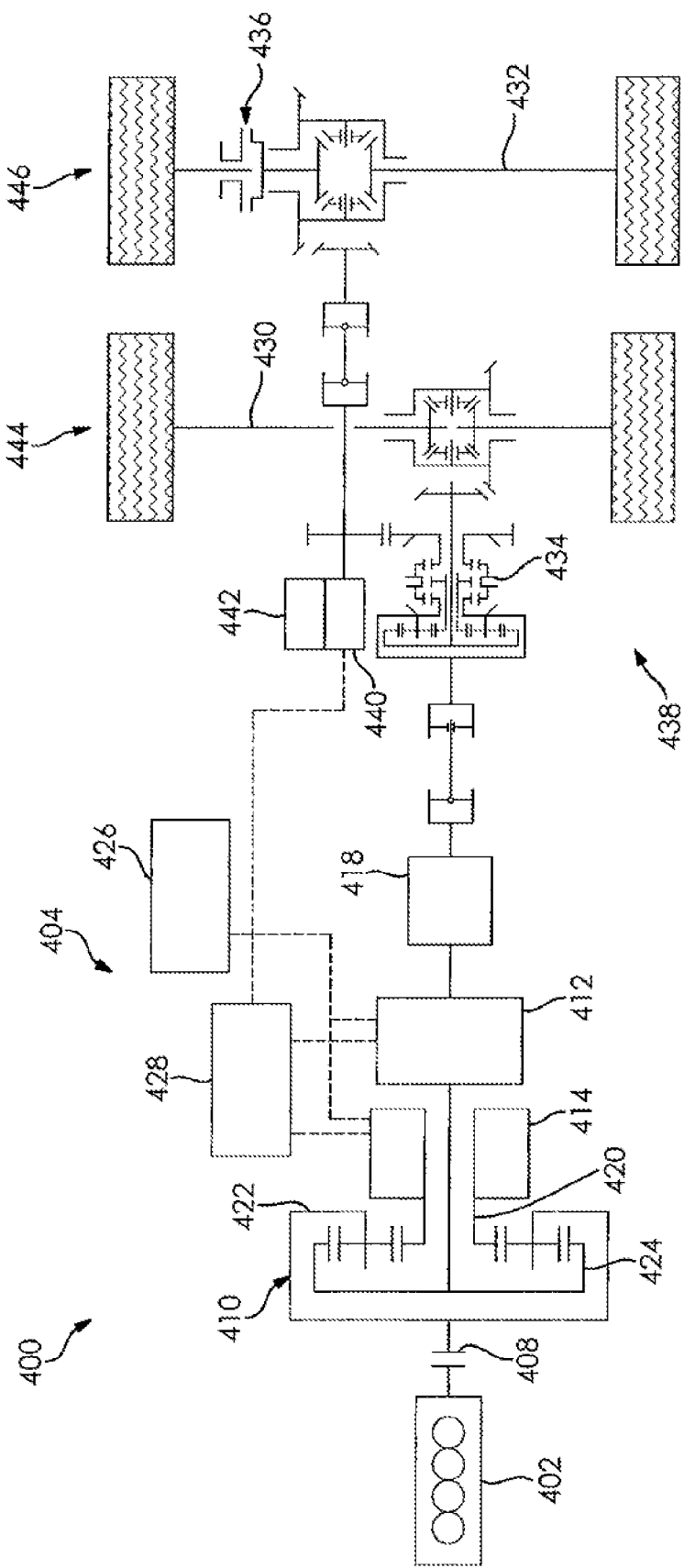
FIG. 4 is a schematic style view of a hybrid drivetrain according to another embodiment of the application.

FIG. 4 is a schematic style view of a hybrid drivetrain 400 according to another embodiment of the application. The hybrid drivetrain 400 includes a power source 402, a hybrid transmission 404, and a motorized tandem axle drive unit 438, the motorized tandem axle drive unit 438 including a first axle drive unit 444 and a second axle drive unit 446. The power source 402 is drivingly engaged with an input of the hybrid transmission 404. The motorized tandem axle drive unit 438 is drivingly engaged with an output of the hybrid transmission 404. The hybrid drivetrain is similar to the hybrid drivetrain 100 shown in FIG. 1, with the exception that the hybrid drivetrain shown in FIG. 4 does not include the secondary clutch 116 and includes the motorized tandem axle drive unit 438.

The motorized tandem axle drive unit 438 is drivingly engaged with a gear box 418, a first axle 430, and a second axle 432. Unlike the tandem axle drive unit 106 shown in FIG. 1, the motorized tandem axle drive unit 438 includes a third motor generator 440 in driving engagement therewith. Further, it is understood that the third motor generator 440, or any other motor generator described herein, may include a power inverter 442, integrated therewith to facilitate a conversion of electrical power needed to operate the third motor generator 440. The third motor generator 440 is in electrical communication with the controller 426 and the battery 428. It is understood that the third motor generator 440, or any of the other motor generators described herein, may be incorporated into a gearbox, transmission, or other driveline component of the hybrid drivetrain 400. The motorized tandem axle drive unit 438 is configured to be placed in two modes of operation, depending on a position of a selection clutch 434. In a first mode of operation, the motorized tandem axle drive unit 438 operates in a high torque, dual axle mode operation, and the third motor generator 440 may apply a driving force to propel or retard a portion of the hybrid drivetrain 400 it is drivingly engaged with. In a second mode of operation, the motorized tandem axle drive unit 438 operates in a low torque, single axle mode operation.

Figure 5:
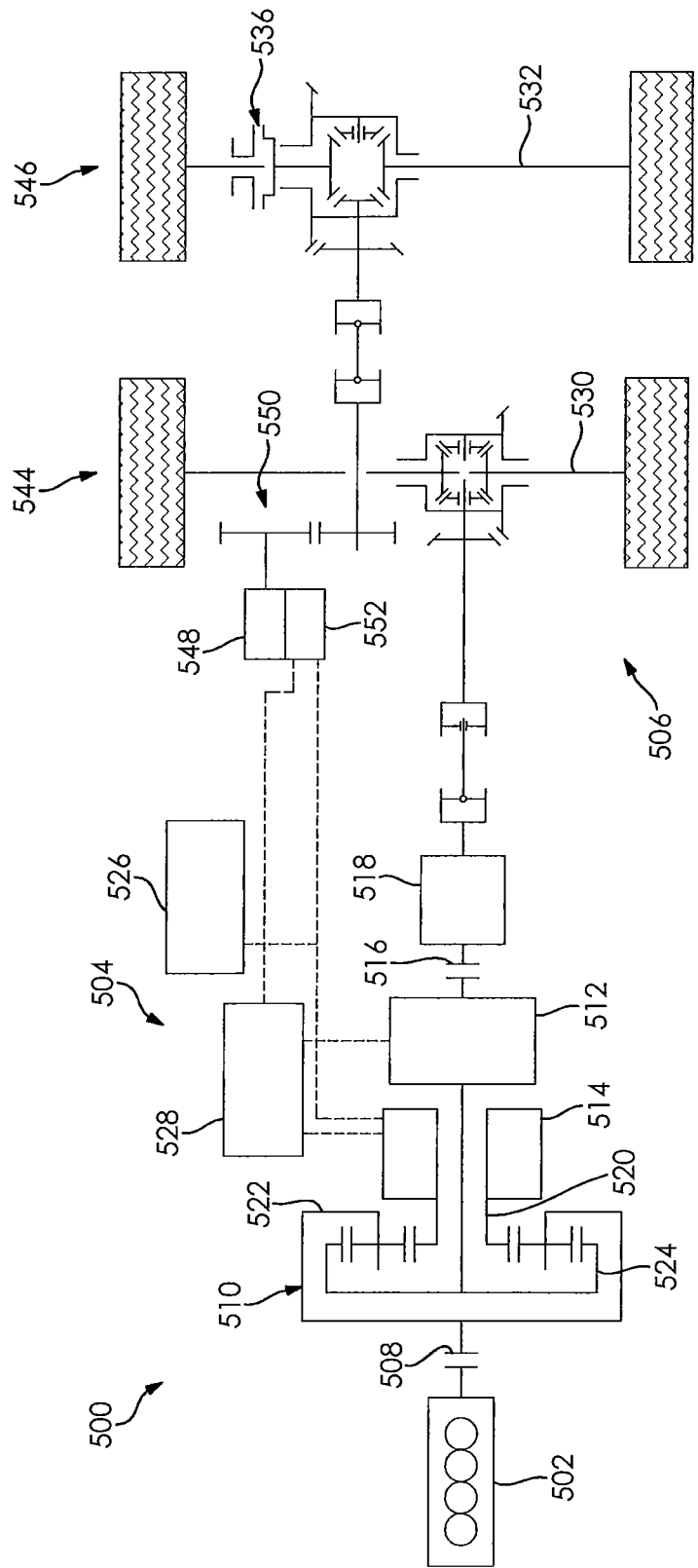
FIG. 5 is a schematic style view of a hybrid drivetrain according to another embodiment of the application.

FIG. 5 is a schematic style view of a hybrid drivetrain 500 according to another embodiment of the application. The hybrid drivetrain includes a power source 502, a hybrid transmission 504, and a tandem axle unit 506, the tandem axle unit 506 including a first axle drive unit 544 and a second axle drive unit 546. The power source 502 is drivingly engaged with an input of the hybrid transmission 504. The first axle drive unit 544 is drivingly engaged with an output of the hybrid transmission 504. The second axle drive unit 546 is in electrical communication with a controller 526 and a battery 528 of the hybrid drivetrain 500. The hybrid drivetrain 500 is similar to the hybrid drivetrain 100 shown in FIG. 1, with the exception that the hybrid drivetrain shown in FIG. 5 includes the first axle drive unit 544 and the second axle drive unit 546.

The first axle drive unit 544 is drivingly engaged with a gear box 518 and a first axle 530 of the hybrid drivetrain 500. The first axle drive unit 544 is conventional and well known in the art and comprises a drive pinion, a ring gear, and differential assembly.

The second axle drive unit 546 includes a third motor generator 548 and is drivingly engaged with a second axle 532 of the hybrid drivetrain. The third motor generator 548 is in electrical communication with the controller 526 and the battery 528. It is understood that the third motor generator 548, or any of the other motor generators described herein, may be incorporated into a gearbox, transmission, or other driveline component of the hybrid drivetrain 500. The third motor generator 548 may apply a driving force to propel or retard the second axle drive unit 546 of the hybrid drivetrain 500 through a countershaft gear assembly 550 and second axle 532, for example. Further, it is understood that the third motor generator 548, or any other motor generator described herein, may include a power inverter 552, integrated therewith to facilitate a conversion of electrical power needed to operate the third motor generator 548.

Figure 6:
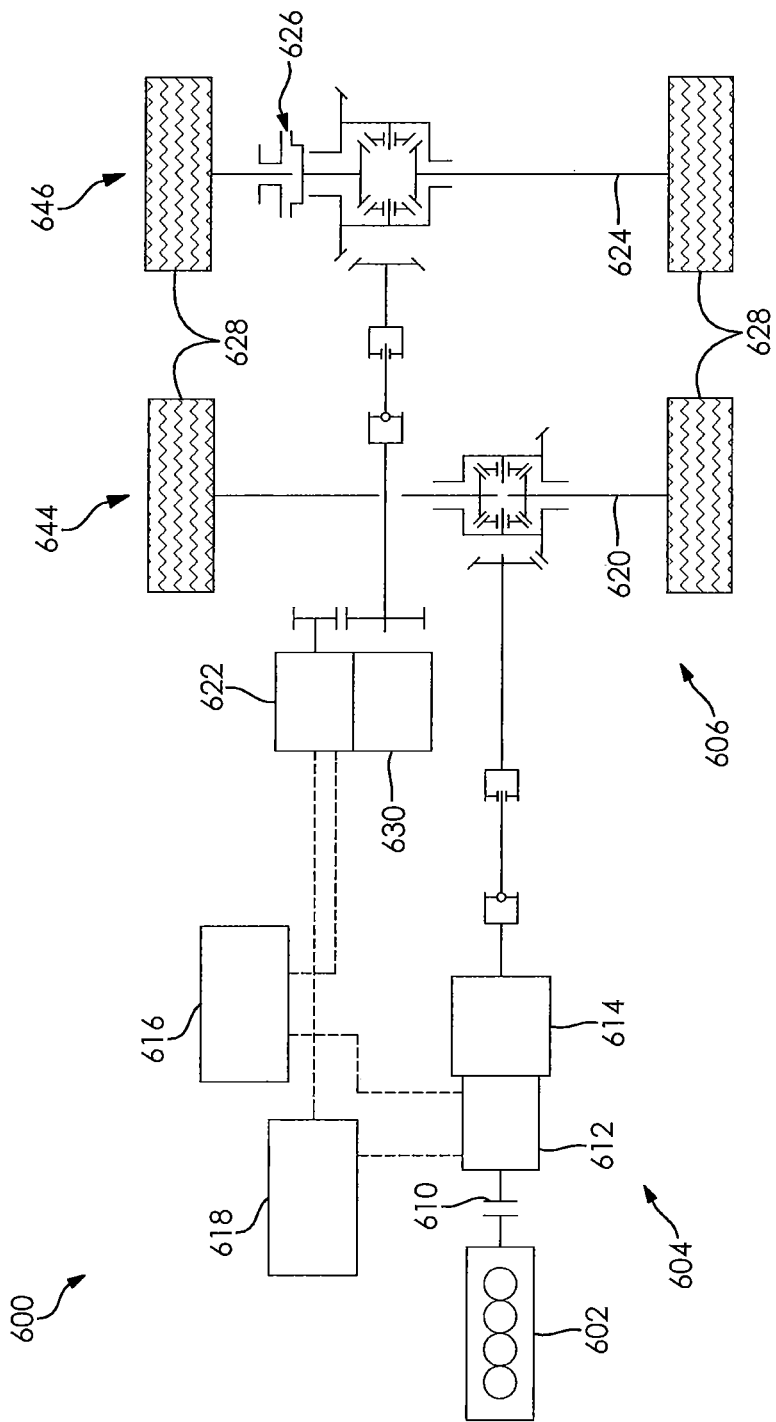
FIG. 6 is a schematic style view of a hybrid drivetrain according to another embodiment of the application.

FIG. 6 is a schematic style view of a hybrid drivetrain 600 according to another embodiment of the application. The hybrid drivetrain 600 includes a power source 602, a hybrid transmission 604, and a tandem axle unit 606, the tandem axle unit 606 including a first axle drive unit 644 and a second axle drive unit 646. The power source 602 is drivingly engaged with an input of the hybrid transmission 604. The first axle drive unit 644 is drivingly engaged with an output of the hybrid transmission 604.

The hybrid transmission 604 includes a primary clutch 610, a first motor-generator 612, and a gear box 614. A portion of the primary clutch 610 acts as the input for the hybrid transmission 604. A portion of the gear box 614 acts as the output for the hybrid transmission 604.

The first motor generator 612 is in driving engagement with the primary clutch 610 and the gear box 614. The first motor generator 612 is in electrical communication with a controller 616 and a battery 618. It is understood that the first motor generator 612, or any of the other motor generators described herein, may be incorporated into a gearbox, transmission, or other driveline component of the hybrid drivetrain 600. Depending on an electrical control of the first motor generator 612 using the controller 616, the first motor generator 6 2 may apply a driving force to propel or retard a portion of the hybrid drivetrain 600 it is drivingly engaged with.

The first axle drive unit 644 is drivingly engaged with the gear box 614 and a first axle 620 of the hybrid drivetrain 600. The first axle drive unit 644 is conventional and well known in the art.

The second axle drive unit 646 includes a second motor generator 622 and is drivingly engaged with a second axle 624 of the hybrid drivetrain 600. The second motor generator 622 is in electrical communication with the controller 616 and the battery 618. It is understood that the second motor generator 622, or any of the other motor generators described herein, may be incorporated into a gearbox, transmission, or other driveline component of the hybrid drivetrain 600. The second motor generator 622 may apply force to propel or retard the second axle 624 of the hybrid drivetrain 600. As shown in FIG. 6, the hybrid driveline includes as optional axle disconnect clutch 626. The hybrid drivetrain 600 is a parallel hybrid drivetrain, and may be operated in a plurality of operating modes as described hereinbelow. The second motor generator 622 may also include additional components to facilitate operation and increased functionality of the second motor generator 622, such as but not limited to, an inverter 630, power electronics for control of the second motor generator 622, a DC-DC converter, or electronics used for a generator function. It is also understood that second motor generator 622 may include at least a portion of a cooling system used for electrical components.

In use, the hybrid drivetrain 600 may be operated in a plurality of operating modes. The hybrid drivetrain 600 may be operated in an all-electric mode, a hybrid mode, a regeneration/braking mode, a charging mode, and a direct drive mode. Further, it is understood that the operating modes described hereinbelow with respect to the hybrid drivetrain 600 may be adapted for use with the other hybrid drivetrains described herein, utilizing the architecture of each to operate in the all-electric mode (where applicable), the hybrid mode, the regeneration/braking mode, the charging mode, and the direct drive mode.

In one embodiment of the all-electric mode, the primary clutch 610 is placed in a disengaged position, and the battery 618 serves as the only power source for the hybrid drivetrain 600 for the vehicle. In the all-electric mode, the hybrid transmission 604, the second motor generator 622, or both the hybrid transmission 604 and second motor generator 622 may apply force to the hybrid drivetrain 600, causing rotation of at least one of a plurality of wheel assemblies 628, propelling the vehicle. When only the hybrid transmission 604 is used in the all-electric mode, the axle disconnect clutch 626 may be placed in a disengaged position, and the first motor-generator 612 of the hybrid transmission 604, in response to communication with the controller 616, applies force to the hybrid drivetrain 600 to propel the vehicle. When only the second motor generator 622 is used in the all-electric mode, the primary clutch 610 is placed in a disengaged position, and the second motor generator 622, in response to communication with the controller 616, applies a driving force to propel the hybrid drivetrain 600 through the second axle 624. When both the hybrid transmission 604 and the second motor generator 622 are used in the all-electric mode, the primary clutch 610 and the axle disconnect clutch 626 are \ placed in an engaged position and the hybrid transmission 604 and the second motor generator 622, in response to communication with the controller 616, apply force to the hybrid drivetrain 600 to propel the vehicle.

In the hybrid mode, the primary clutch 610 is placed in an engaged position, and the battery 618 and the power source 602 serve as a combined power source for the hybrid drivetrain 600 for the vehicle. In the hybrid mode, the hybrid transmission 604, the second motor generator 622, or both the hybrid transmission 604 and the second motor generator 622, in addition to the power source 602, may apply a driving force to the hybrid drivetrain 600 to propel the vehicle. When the hybrid transmission 604 and the second motor generator 622 are used in the hybrid mode, the primary clutch 610 and the axle disconnect clutch 626 are placed in an engaged position, and the hybrid transmission 604, the second motor generator 622, and the power source 602, in response to communication with the controller 616, apply force to the hybrid drivetrain 600 to propel the vehicle. When the hybrid transmission 604 is used in the hybrid mode, the primary clutch 6 0 is placed in an engaged position and the axle disconnect clutch 626 is placed in a disengaged position, and the hybrid transmission 604 and the power source 602 (applying a driving force through the first motor generator 612), in response to communication with the controller 616, apply a driving force to the hybrid drivetrain 600 to propel the vehicle. When the second motor generator 622 is used in the hybrid mode, the primary clutch 610 and the axle disconnect clutch 626 are placed in an engaged position, and the second motor generator 622 and the power source 602 (applying force through the first motor generator 6 2), in response to communication with the controller 616, apply a driving force to the hybrid drivetrain 600 to propel the vehicle.

In the regeneration/braking mode, the hybrid transmission 604, the second motor generator 622, or both the hybrid transmission 604 and the second motor generator 622 are used to retard the hybrid drivetrain 600 for the vehicle to facilitate capturing kinetic energy of the vehicle as electrical power to be stored in the battery 618. The regeneration/braking mode may be used to assist a conventional braking system or may be used to regulate a speed of the vehicle when descending an incline. When the second motor generator 622 is used in the regeneration/braking mode, the axle disconnect clutch 626 is placed in an engaged position and the primary clutch 610 may be placed in a disengaged condition (it is understood that engine braking using the power source 602 may or may not be used in addition to the regeneration/braking mode), and the second motor generator 622 retards the hybrid drivetrain 600 to capture kinetic energy as electrical power. When the hybrid transmission 604 is used in the regeneration/braking mode, the axle disconnect clutch 626 may be placed in a disengaged position and the primary clutch 610 may be placed in a disengaged condition (it is understood that engine braking using the power source 602 may or may not be used in addition to the regeneration/braking mode), and the hybrid transmission 604 retards the hybrid drivetrain 600 to capture kinetic energy as electrical power. When both the hybrid transmission 604 and the second motor generator 622 are used in the regeneration/braking mode, the axle disconnect clutch 626 is placed in a disengaged position and the primary clutch 610 may be placed in a disengaged condition (it is understood that engine braking using the power source 602 may or may not be used in addition to the regeneration/braking mode), and both the hybrid transmission 604 and the second motor generator 622 retard the hybrid drivetrain 600 to capture kinetic energy as electrical power.

In the charging mode, the power source 602 and the first motor generator 612 or the second motor generator 622 are used to charge the battery 618. It is understood that the charging mode may be utilized when the hybrid transmission 604 is propelling the vehicle in the direct drive mode. In the charging mode, the axle disconnect clutch 626 may be placed in a disengaged position and the primary clutch 610 is placed in an engaged condition, allowing the power source 602 and the first motor generator 612 to charge the battery 618 while the hybrid transmission 604 is used to propel the vehicle, if desired.

In the direct drive mode, neither the first motor generator 612 nor the second motor generator 622 are used to propel the vehicle. It is understood that the direct drive mode may be utilized when a charge level of the battery 618 does not permit operation in the all-electric or hybrid modes. In the direct drive mode, the primary clutch 610 is placed in an engaged position, and the power source 602 in response to communication with the controller 616, applies force (through the first motor generator 612 and the hybrid transmission 604) to the hybrid drivetrain 600 to propel the vehicle.

Figure 7:
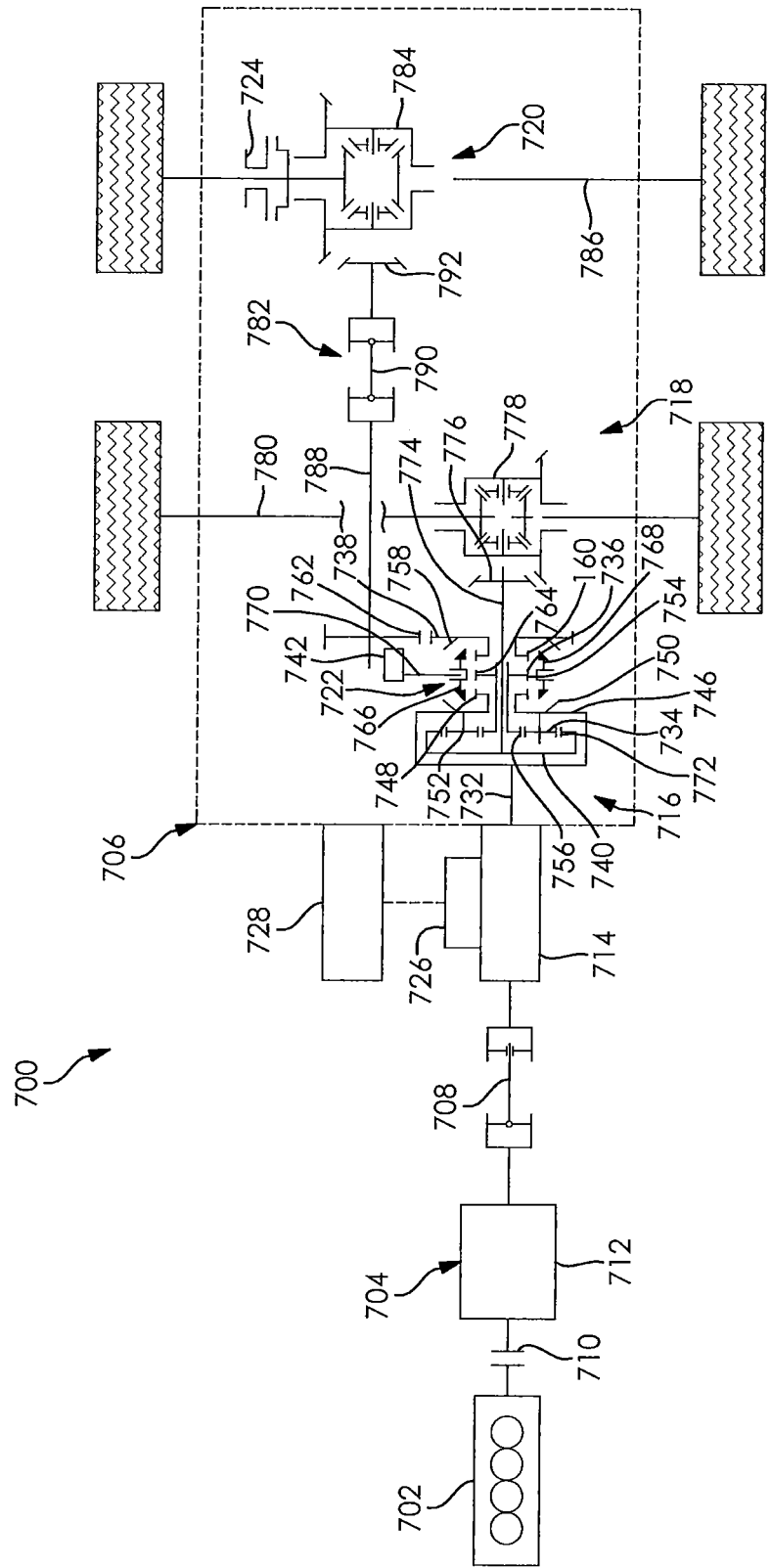
FIG. 7 is a schematic style view of a hybrid drivetrain according to another embodiment of the application.

FIG. 7 is a schematic style view of a hybrid drivetrain 700 according to another embodiment of the application. The hybrid drivetrain 700 includes a power source 702, a transmission 704, and a hybrid tandem axle drive unit 706, the hybrid tandem axle drive unit 706 including a first axle drive unit 7 8 and a second axle drive unit 720. The power source 702 is drivingly engaged with an input of the transmission 704. The hybrid tandem axle drive unit 706 is drivingly engaged with an output of the transmission 704 through a Cardan shaft 708, for example.

The power source 702 is an internal combustion engine, however, it is understood that the power source 702 may also be a hybrid type power source incorporating a secondary power source in addition to an internal combustion engine. Further, it is understood that the power source 702 may also be a source of electrical power, such as a fuel cell.

The transmission 704 includes at least a primary clutch 710 and a gear arrangement 712; however, it is understood that the primary clutch 710 may form a portion of the gear arrangement 712 or that the primary clutch 710 is a separate component from the gear arrangement 712 and drivingly engaged therewith in any conventional manner. A portion of the primary clutch 710 acts as the input for the transmission 704. A portion of the gear arrangement 712 acts as the output for the transmission 704. The primary clutch 710 is a clutch which can be variably engaged, such as a plate or cone style clutch. The gear arrangement 712 forms a multi-speed gearbox in driving engagement with a portion of the primary clutch 710 and the hybrid tandem axle drive unit 706. The gear arrangement 712 may be manually or automatically operated.

The hybrid tandem axle drive unit 706 is drivingly engaged with the transmission 704 through the Cardan shaft 708; however, it is understood that certain embodiments of the application may not require the Cardan shaft 708. The hybrid tandem axle drive unit 706 comprises a motor-generator 714, a planetary drive unit 716, a first axle drive assembly 718, and a second axle drive assembly 720. The hybrid tandem axle drive unit 706 is configured to be placed in at least two modes of operation, depending on a position of a selection clutch 722 of the planetary drive unit 716. In a first mode of operation, the hybrid tandem axle drive unit 706 operates in a high torque, dual axle mode operation. In a second mode of operation, the hybrid tandem axle drive unit 706 operates in a low torque, single axle mode operation. As shown in FIG. 7, the hybrid driveline 700 includes as optional an axle disconnect clutch 724 forming a portion of the second axle drive assembly 720.

The motor-generator 714 is in driving engagement with the transmission 704 through the Cardan shaft 708 and the planetary drive unit 716. The motor-generator 714 is in electrical communication with a controller 726 and a battery 728. It is understood that the third motor-generator 714, or any of the other motor generators described herein, may be incorporated into a gearbox, transmission, or other driveline component of the hybrid drivetrain 700. Depending on an electrical control of the motor-generator 714 using the controller 726, the motor-generator 714 may apply force to or retard the portion of the hybrid drivetrain 700 it is drivingly engaged with. The motor-generator 714 may also include additional components to facilitate operation and increased functionality of the motor-generator 714, such as but not limited to, an inverter, power electronics for control of the motor-generator 714, a DC-DC converter, or electronics used for a generator function. It is also understood that the motor-generator 714 may include at least a portion of a cooling system used for electrical components.

The controller 726 is in electrical communication with at least the motor-generator 714 and the battery 728. The controller 726 may be a hybrid supervisory controller with dual range disconnect control management. It is understood that the controller 726 may also be in communication with at least one of the power source 702, the primary clutch 710, the planetary drive unit 716, the axle disconnect clutch 724 of the hybrid tandem axle drive unit 706, a vehicle controller (not shown), the gear arrangement 712, an engine controller (not shown), a braking controller (not shown), another type of controller, an advanced driver assistance system (ADAS), or an automated driving controller. The controller 726 controls an operating mode of the hybrid tandem axle drive 706 unit by at least controlling engagement of the primary clutch 710, by communicating with a transmission controller (not shown) to adjust an operating range of the gear arrangement 712, by controlling the axle mode, by adjusting a position of the selection clutch 722 of the planetary drive unit 716, by controlling the motor-generator 714, and by adjusting a position of the axle disconnect clutch 724 to apply a driving force to propel or retard portions of the hybrid drivetrain 700 each are respectively drivingly engaged with.

The battery 728 is a rechargeable, electrochemical energy storage device in electrical communication with the controller 726 and the motor-generator 714. It is understood that the battery 728 may also be in electrical communication with other components of the hybrid drivetrain 700 or the vehicle to supply power thereto. Further, it is understood that the battery 728 may also be another type of electrical storage, such as an supercapacitor. In response to the controller 726 adjusting an operating mode of the hybrid drivetrain 700, the battery 728 may be charged or discharged. It is also understood that the battery 728 may include at least a portion of a cooling system used for electrical components. The planetary drive unit 716 includes an input shaft 732, a plurality of driving pinions 734, a transfer shaft 736, a second output gear 738, a first output gear 740, and the selection clutch 722. The components 732, 734, 736, 738, 740, 722 may be formed from a hardened steel, however the components 732, 734, 736, 738, 740, 722 may be formed from any other rigid material. As shown, the planetary drive unit 716 includes the six components 732, 734, 736, 738, 740, 722 disposed in a housing 741 but it is understood the planetary drive unit 716 may include fewer or more components. In response to a signal sent by the controller 726, an actuator 742 adjusts a position of the selection clutch 722.

The input shaft 732 is at least partially disposed in a housing (not shown). The input shaft 732 may be an elongate member, however the input shaft 732 may be any other shape. Bearings (not shown) disposed between the input shaft 732 and the housing permit the input shaft 732 to rotate about an axis of the input shaft 732. The input shaft 732 has a first end portion drivingly engaged with the motor-generator 714 and a second end portion having a pinion carrier 746, a first set of clutch gear teeth 748, and an engagement portion 750 formed thereon. The second end portion is a substantially hollow body having a diameter greater than a diameter of the first end portion. The second end portion is drivingly coupled to the input shaft 732. Alternately, the second end portion may be integrally formed with the input shaft 732.

The pinion carrier 746 is a substantially disc shaped body drivingly coupled to the second end portion of the input shaft 732. The pinion carrier 746 includes a plurality of pinion supports 752 protruding from a first side of the pinion carrier 746 into the second end portion of the input shaft 732. The engagement portion 750 is formed on a second side of the pinion carrier 746. As is known in the art, the pinion carrier 746 is also known as a planet carrier.

The engagement portion 750 is a conical surface oblique to the input shaft 732, however, the engagement portion 750 may have any other shape. The first set of clutch gear teeth 748 are formed on the pinion carrier 746 radially inward from the engagement portion 750.

The plurality of driving pinions 734 are rotatably coupled to the pinion supports 752. Each of the driving pinions 734 have gear teeth formed on an outer surface thereof. As is known in the art, each of the driving pinions 734 is also known as a planet gear. Bearings may be disposed between each of the driving pinions 734 and the pinion supports 752, however, the driving pinions 710 may be directly mounted on the pinion supports.

The transfer shaft 736 is a shaft rotatably disposed in the housing and having an axis of rotation concurrent with the axis of rotation of the input shaft 732. The transfer shaft 736 may be a hollow elongate cylindrical member, however the transfer shaft 736 may be any other shape. Bearings (not shown) disposed between the transfer shaft 736 and pinion carrier 746 permit the transfer shaft 736 to rotate about an axis of the transfer shaft 736. The transfer shaft 736 has a first end portion having a first set of clutch gear teeth 754 formed on an outer surface thereof, and a second end portion having a second set of gear teeth 756 formed on an outer surface thereof. The first end portion and the second end portion are integrally formed with the transfer shaft 736 and may have a diameter substantially equal to the transfer shaft 736. Alternately, the first end portion and the second end portion may be substantially disc shaped bodies having an outer diameter greater than a diameter of the transfer shaft 736. The first end portion and the second end portion may be drivingly coupled to the transfer shaft 736. Similarly, the first set of clutch gear teeth 754 and the second set of gear teeth 756 may be formed directly in the transfer shaft 736. As is known in the art, the second end portion having the gear teeth 756 is known as a sun gear. The second set of gear teeth 756 are engaged with the plurality of driving pinions 734 and the first set of clutch gear teeth 754 are disposed adjacent the first set of clutch gear teeth 748 of the pinion carrier 746.

The second output gear 738 is a gear concentrically disposed about a portion of the transfer shaft 736. The second output gear 738 has a central perforation having a diameter greater than a diameter of the transfer shaft 736. The second output gear 738 is a substantially disc shaped body having a first end portion, a second end portion defining an outer diameter of the second output gear 738, and an engagement portion 758. Bearings disposed between the second output gear 738 and the housing permit the second output gear 738 to rotate about an axis of the second output gear 738. The axis of the second output gear 738 is concurrent with the axis of the input shaft 732. A first set of clutch gear teeth 760 are formed on the first end portion adjacent the first set of clutch gear teeth 754 of the transfer shaft 736. A second set of gear teeth 762 are formed on the second end portion. The engagement portion 758 is formed in the second output gear 738 intermediate the first end portion and the second end portion. As shown, the engagement portion 758 is a conical surface oblique to the input shaft 732; however, the engagement portion 758 may have any other shape.

The selection clutch 722 is concentrically disposed about the transfer shaft 736. The selection clutch 722 includes a set of inner clutch collar teeth 764 formed on an inner surface thereof, a first synchronizer ring 766, and a second synchronizer ring 768. The second synchronizer ring 768 may be a cone clutch that is used in conjunction with a dog clutch, wherein shifting the selection clutch 722 utilizes a torque interrupt shift. It is understood that it is also within the scope of the application for the selection clutch 722 to be a dog style clutch that does not utilize synchronizers, requiring the hybrid driveline 700 to be placed in a non-moving state before the selection clutch 722 can be moved. The set of inner clutch collar teeth 764 are engaged with the first set of clutch gear teeth 754 of the transfer shaft 736. The selection clutch 722 can be slidably moved along the axis of the input shaft 732 as directed by the controller 726 while maintaining engagement of the inner clutch collar teeth 764 and the first set of clutch gear teeth 754. A shift fork 770 disposed in an annular recess formed in the selection clutch 722 moves the selection clutch 722 along the axis of the input shaft 732 into a first position, a second position, or a neutral position. The actuator 742, which is drivingly engaged with the shift fork 770, is engaged to position the shift fork 770 as directed by the controller 726. Consequently, the shift fork 770 positions the selection clutch 722 into the first position, the second position, or the neutral position. In the first position, the selection clutch 722 is drivingly engaged with the first set of clutch gear teeth 754 of the transfer shaft 736 and the first set of clutch gear teeth 748 of the pinion carrier 746. In the second position, the selection clutch 722 is drivingly engaged with the first set of clutch gear teeth 754 of the transfer shaft 736 and the first set of clutch gear teeth 760 of the second output gear 738. In one embodiment of the neutral position, the inner clutch collar teeth 764 of the selection clutch 722 are only drivingly engaged with the first set of clutch gear teeth 754 of the transfer shaft 736. It is understood the selection clutch 722, the clutch gear teeth 754, 748, 760, 764, the synchronizer rings 766, 768, and the engagement portions 750, 758 may be substituted with any clutching device that permits selective engagement of a driving and a driven part.

The first synchronizer ring 766 is an annular body coupled to the selection clutch 722 adjacent the engagement portion 750 of the pinion carrier 746. The first synchronizer ring 766 has a first conical engagement surface. Alternately, the first synchronizer ring 766 may have an engagement surface having any other shape. A biasing member (not shown) is disposed between the selection clutch 722 and the first synchronizer ring 766 to urge the first synchronizer ring 766 away from the selection clutch 722. When the selection clutch 722 is moved from the second position into the first position, the first conical engagement surface contacts the engagement portion 750 of the pinion carrier 746. As the selection clutch 722 moves towards the first set of clutch gear teeth 748 of the input shaft 732, the biasing member is compressed while the selection clutch 722 engages the first set of clutch gear teeth 748 of the transfer shaft 736 and before the selection clutch 722 engages the first set of clutch gear teeth 748 of the pinion carrier 746.

The second synchronizer ring 768 is an annular body coupled to the selection clutch 722 adjacent the first end portion of the second output gear 738. The second synchronizer ring 768 has a second conical engagement surface. Alternately, the second synchronizer ring 738 may have an engagement surface having any other shape. A biasing member (not shown) is disposed between the selection clutch 722 and the second synchronizer ring 768 to urge the second synchronizer ring 768 away from the selection clutch 722. When the selection clutch 722 is moved from the first position into the second position, the second conical engagement surface contacts the engagement portion 758 of the second output gear 738. As the selection clutch 722 moves towards the first set of clutch gear teeth 760 of the second output gear 738, the biasing member is compressed while the selection clutch 722 engages the first set of clutch gear teeth 754 of the transfer shaft 736 and before the selection clutch 722 engages the first set of clutch gear teeth 760 of the second output gear 738.

The first output gear 740 is a gear concentrically disposed within the second end portion of the input shaft 732. The first output gear 740 is a substantially cup shaped body having an inner surface having gear teeth 772 formed on. As is known in the art, the first output gear 740 is known as a ring gear. The gear teeth 772 are engaged with the gear teeth formed on the outer surface of each of the driving pinions 734. The first output gear 740 includes an output shaft 774 and first axle drive pinion 776 drivingly coupled thereto. Alternately, the first output gear 740 may be integrally formed with the output shaft 774. The output shaft 774 is collinear with the input shaft 732. Bearings disposed between the output shaft 774 and the housing support the output shaft 774 and permit the output shaft 774 to rotate about an axis of the output shaft 774. The first axle drive pinion 776 is a spiral bevel gear the facilitates driving engagement between the axle output shaft 774 and the first axle drive assembly 718; however, it is understood that other type of gears may be used.

The first axle drive assembly 718 includes a first differential assembly 778 and a first drive axle 780. The first differential assembly 778 and the first drive axle 780 are at least partially disposed in a first axle housing (not shown). The first differential assembly 778 is a conventional differential assembly comprising a ring gear, differential housing, drive pinions, and side gears as known in the art. The side gears of the first differential assembly 778 are respectively drivingly engaged with a first axle output shaft and the second axle output shaft of the first drive axle 780. The ring gear of the first differential assembly 778 is drivingly engaged with the first axle drive pinion 776 to facilitate driving engagement between the first output gear 740 and the differential assembly.

The second axle drive assembly 720 includes an inter-axle assembly 782, a second differential assembly 784, a second drive axle 786, and the axle disconnect clutch 724. The second differential assembly 784, the second drive axle 786, and the axle disconnect clutch 724 are at least partially disposed in a second axle housing (not shown). The inter-axle assembly 782 comprises a geared shaft 788 in driving engagement with the second output gear 738, a Cardan shaft 790 in driving engagement with the geared shaft 788, and a second axle drive pinion 792 in driving engagement with the Cardan shaft 790. The second differential assembly 784 is a conventional differential assembly comprising a ring gear, differential housing, drive pinions, and side gears as known in the art. The side gears of the second differential assembly 784 are respectively drivingly engaged with a first axle output shaft and the second axle output shaft of the second drive axle 786. The ring gear of the second differential assembly 784 is drivingly engaged with the inter-axle assembly 782 to facilitate driving engagement between the second output gear 738 and the second differential assembly 784. The second drive axle 786 comprises the first axle output shaft and the second axle output shaft. One of the first axle output shaft and the second axle output shaft may be divided into two portions by disengaging the axle disconnect clutch 724. By disengaging the axle disconnect clutch 724, the inter-axle assembly 782 and the second differential assembly 784 are prevented from being back-driven when the hybrid tandem axle drive unit 706 is placed in a single axle mode of operation.

In use, through control of the primary clutch 710, the selection clutch 722, and the axle disconnect clutch 724, driving and charging can occur with and without engagement with the rest of the hybrid drivetrain 700. The hybrid drivetrain 700 is a parallel post transmission hybrid drivetrain that allows the tandem axle drive unit 706 to be operated in a plurality of modes, as described hereinbelow. The motor generator 714 is placed inline in the hybrid driveline, and can be used to power or supplement the power source 702 for boosting or to recuperate the braking energy via the hybrid driveline 700 by applying torque to the planetary drive unit 716 or receiving torque from the drive axles 180, 786 via the planetary drive unit 716. The motor generator 714 provides the following benefits: engine downsizing, efficiency improvement by operating the power source 702 within a narrower band (allowing the motor generator 714 to provide acceleration flexibility), reduced gearing in the transmission 704, increased retrofitability, and increased functionality of a two speed electrified axle that increases performance of the hybrid driveline 700 having the motor generator 714 located in front of the planetary drive unit 716. Further, it is understood that through the addition of the motor generator 714, the controller 726, and the battery 728, a conventional driveline may be retrofitted to form the hybrid drivetrain 700. It is also understood that the hybrid drivetrain 700 may be configured to implement techniques that improve an efficiency of the hybrid drivetrain 700, such as, but not limited to, on-demand cylinder deactivation of a portion of the power source 702 via fuel shut off.

Figure 8:
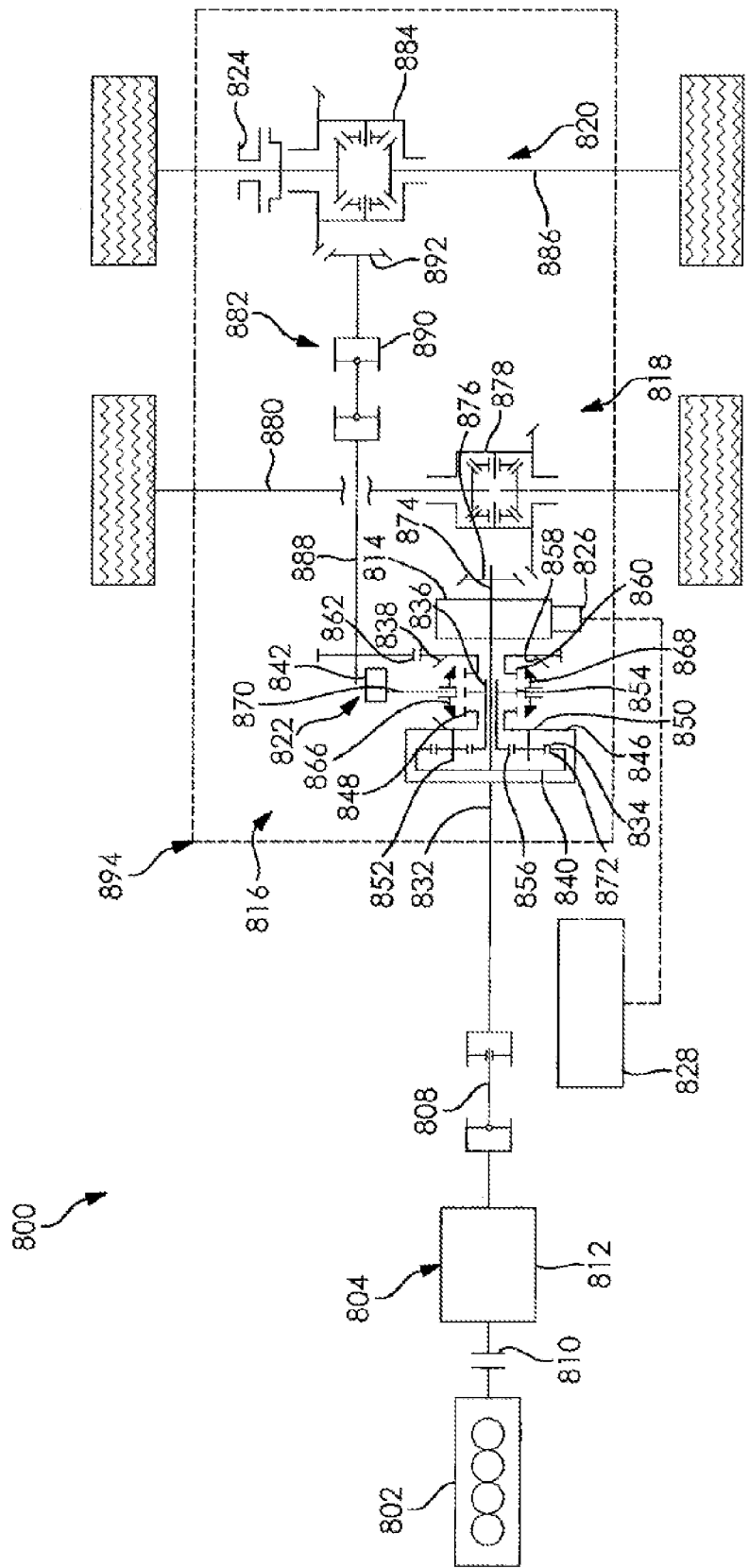
FIG. 8 is a schematic style view of a hybrid drivetrain according to another embodiment of the application.

FIG. 8 is a schematic style view of a hybrid drivetrain 800 according to another embodiment of the application. The hybrid drivetrain 800 includes a power source 802, a transmission 804, and a hybrid tandem axle drive unit 894, the hybrid tandem axle drive unit 894 including a first axle drive assembly 818 and a second axle drive assembly 820. The power source 802 is drivingly engaged with an input of the transmission 804. The hybrid tandem axle drive unit 894 is drivingly engaged with an output of the transmission 804 through a Cardan shaft 808, for example. The hybrid drivetrain 800 is similar to the hybrid drivetrain 700 shown in FIG. 7, with the exception that the hybrid drivetrain 800 shown in FIG. 8 includes a variation of the hybrid tandem axle drive unit 706. In one embodiment of the hybrid drivetrain 800 includes a motor-generator 814 located after a planetary drive unit 816 and provides for operation at only a single operation speed of the hybrid drivetrain 800. The variation of the application shown in FIG. 8 includes similar components to the hybrid drivetrain 700 illustrated in FIG. 7. Similar features of the variation shown in FIG. 8 are numbered similarly in series. Different and additional features of the variation shown in FIG. 8 can be appreciated by one skilled in the art in view of FIG. 8 and the hybrid drivetrain 700 illustrated in FIG. 7.

The hybrid tandem axle drive unit 894 is drivingly engaged with the transmission 804 through the Cardan shaft 808. The hybrid tandem axle drive unit 894 comprises the planetary drive unit 816, the motor-generator 814, the first axle drive assembly 818, and the second axle drive assembly 820. The hybrid tandem axle drive unit 894 is configured to be placed in at least two modes of operation, depending on a position of a selection clutch 822 of the planetary drive unit 816. In a first mode of operation, the hybrid tandem axle drive unit 894 operates in a high torque, dual axle mode operation. In a second mode of operation, the hybrid tandem axle drive unit 894 operates in a low torque, single axle mode operation. As shown in FIG. 8, the hybrid driveline 800 includes as optional an axle disconnect clutch 824 forming a portion of the second axle drive assembly 820.

The motor-generator 814 is in driving engagement with the output shaft 874 of the first output gear 840 of the planetary drive unit 816, The motor-generator 814 is in electrical communication with a controller 826 and a battery 828. It is understood that the motor-generator 814, or any of the other motor generators described herein, may be incorporated into a gearbox, transmission, or other driveline component of the hybrid drivetrain 800. Depending on an electrical control of the motor-generator 814 using the controller 826, the motor-generator 814 may apply force to or retard the output shaft 874 with which it is drivingly engaged with.

Figure 9:
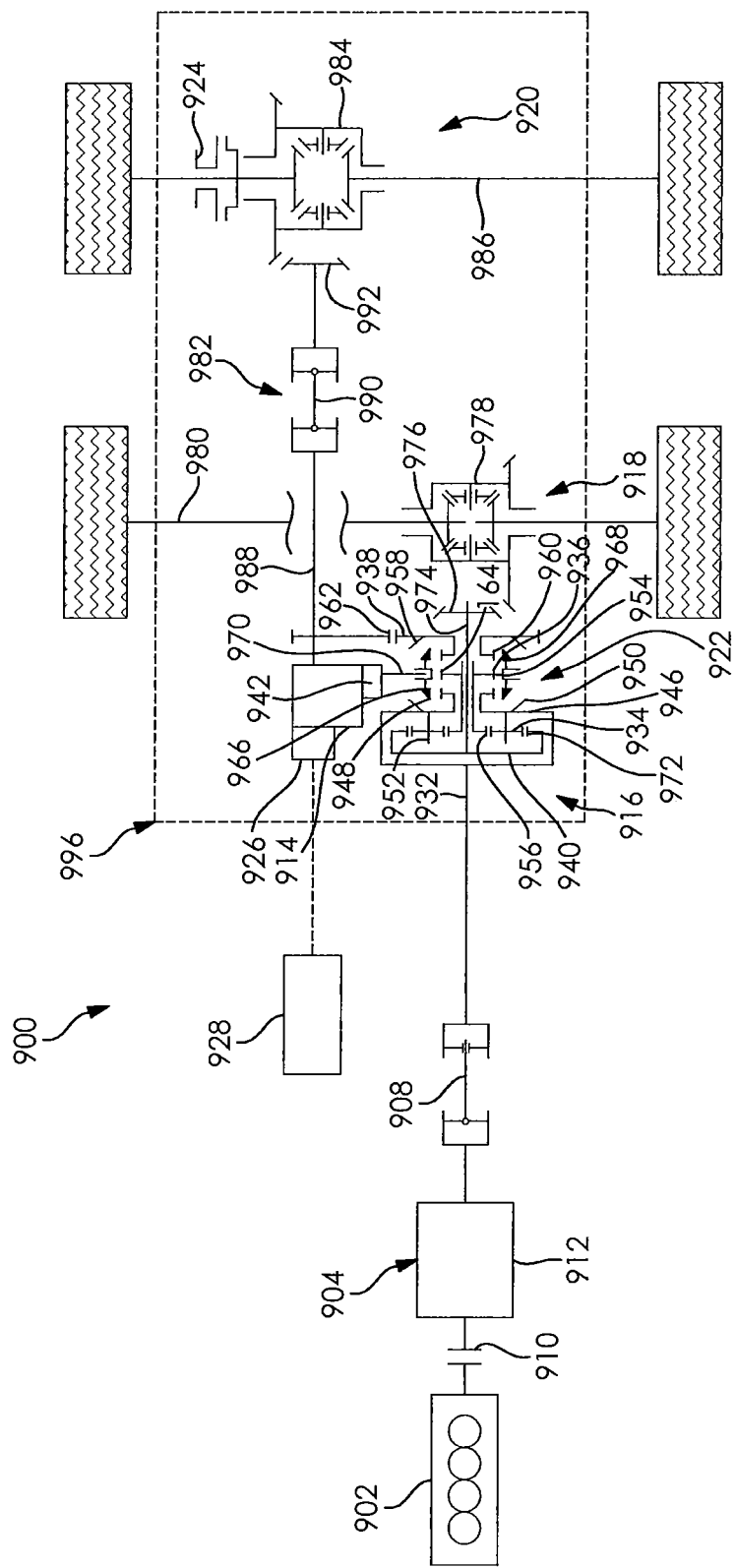
FIG. 9 is a schematic style view of a hybrid drivetrain according to another embodiment of the application.

FIG. 9 is a schematic style view of a hybrid drivetrain 900 according to another embodiment of the application. The hybrid drivetrain 900 includes a power source 902, a transmission 904, and a hybrid tandem axle drive unit 996, the hybrid tandem axle drive unit 996 including a first axle drive assembly 918 and a second axle drive unit assembly 920. The power source 902 is drivingly engaged with an input of the transmission 904. The hybrid tandem axle drive unit 996 is drivingly engaged with an output of the transmission 904 through a Cardan shaft 908, for example. The hybrid drivetrain 900 is similar to the hybrid drivetrain 700 shown in FIG. 7, with the exception that the hybrid drivetrain 900 shown in FIG. 9 includes a variation of the hybrid tandem axle drive unit 706. The variation of the application shown in FIG. 9 includes similar components to the hybrid drivetrain 700 illustrated in FIG. 7. Similar features of the variation shown in FIG. 9 are numbered similarly in series. Different and additional features of the variation shown in FIG. 9 can be appreciated by one skilled in the art in view of FIG. 9 and the hybrid drivetrain 700 illustrated in FIG. 7.

The hybrid tandem axle drive unit 996 is drivingly engaged with the transmission 904 through the Cardan shaft 908. The hybrid tandem axle drive unit 996 comprises a planetary drive unit 916, the first axle drive assembly 918, a motor-generator 914, and the second axle drive assembly 920. The hybrid tandem axle drive unit 996 is configured to be placed in at least two modes of operation, depending on a position of a selection clutch 922 of the planetary drive unit 916. In a first mode of operation, the hybrid tandem axle drive unit 996 operates in a high torque, dual axle mode operation. In a second mode of operation, the hybrid tandem axle drive unit 996 operates in a low torque, single axle mode operation. As shown in FIG. 9, the hybrid driveline 900 includes as optional an axle disconnect clutch 924 forming a portion of the second axle drive assembly 920.

The motor-generator 914 is in driving engagement with a geared shaft 988 of an inter-axle assembly 982 of the second axle drive assembly 920. The motor-generator 914 is in electrical communication with a controller 926 and a battery 928. It is understood that the motor-generator 914, or any of the other motor generators described herein, may be incorporated into a gearbox, transmission, or other driveline component of the hybrid drivetrain 900.

Depending on an electrical control of the motor-generator 914 using the controller 926, the motor-generator 914 may apply force to or retard the geared shaft 988 with which it is drivingly engaged with.

Figure 10:
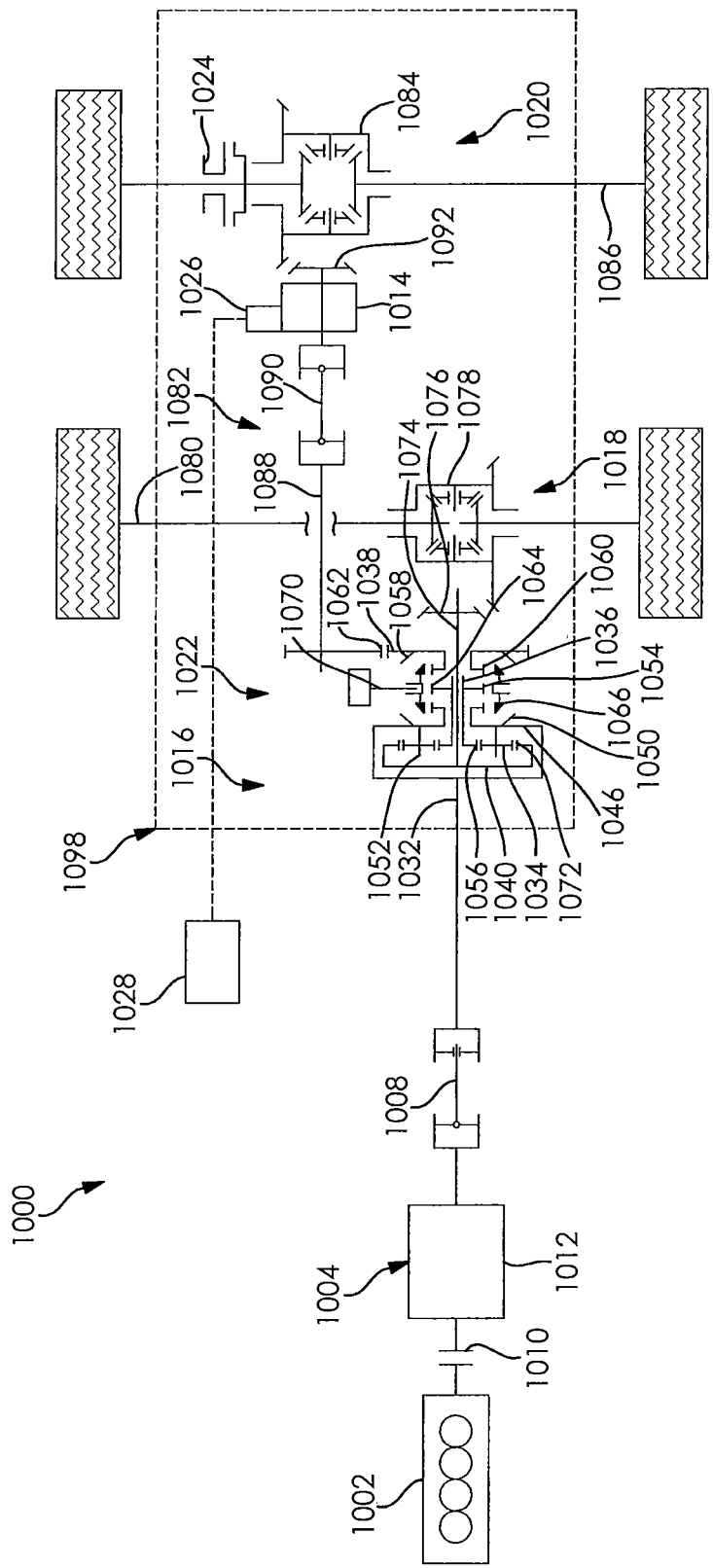
FIG. 10 is a schematic style view of a hybrid drivetrain according to another embodiment of the application.

FIG. 10 is a schematic style view of a hybrid drivetrain 1000 according to another embodiment of the application. The hybrid drivetrain 1000 includes a power source 1002, a transmission 1004, and a hybrid tandem axle drive unit 1098, the hybrid tandem axle drive unit 1098 including a first axle drive assembly 1018 and a second axle drive assembly 1020. The power source 1002 is drivingly engaged with an input of the transmission 1004. The hybrid tandem axle drive unit 1098 is drivingly engaged with an output of the transmission 1004 through a Cardan shaft 1008, for example. The hybrid drivetrain 1000 is similar to the hybrid drivetrain 700 shown in FIG. 7, with the exception that the hybrid drivetrain 1000 shown in FIG. 10 includes a variation of the hybrid tandem axle drive unit 706. The variation of the application shown in FIG. 10 includes similar components to the hybrid drivetrain 700 illustrated in FIG. 7. Similar features of the variation shown in FIG. 10 are numbered similarly in series. Different and additional features of the variation shown in FIG. 10 can be appreciated by one skilled in the art in view of FIG. 10 and the hybrid drivetrain 700 illustrated in FIG. 7. The hybrid tandem axle drive unit 1098 is drivingly engaged with the transmission 1004 through the Cardan shaft 1008. The hybrid tandem axle drive unit 1098 comprises a planetary drive unit 1016, the first axle drive assembly 018, a motor-generator 1014, and the second axle drive assembly 1020. The hybrid tandem axle drive unit 1098 is configured to be placed in at least two modes of operation, depending on a position of a selection clutch 1022 of the planetary drive unit 1016. In a first mode of operation, the hybrid tandem axle drive unit 1098 operates in a high torque, dual axle mode operation. In a second mode of operation, the hybrid tandem axle drive unit 1098 operates in a low torque, single axle mode operation. As shown in FIG. 10, the hybrid driveline 1000 includes as optional an axle disconnect clutch 1024 forming a portion of the second axle drive assembly 1020.

The motor-generator 1014 is in driving engagement with a second axle drive pinion 1092 of an inter-axle assembly 1082 of the second axle drive assembly 1020. The motor-generator 1014 is in electrical communication with a controller 1026 and a battery 1028. It is understood that the motor-generator 1014, or any of the other motor generators described herein, may be incorporated into a gearbox, transmission, or other driveline component of the hybrid drivetrain 1000. Depending on an electrical control of the motor-generator 1014 using the controller 1026, the motor-generator 1014 may apply force to or retard the second axle drive pinion 1092 with which it is drivingly engaged with.

In use, the hybrid drivetrain 700, 800, 900, 1000 may be operated in a plurality of operating modes. The hybrid drivetrain 700, 800, 900, 1000 may be operated in an all-electric mode, a hybrid mode, a regeneration/braking mode, a charging mode, and a direct drive mode. Further, it is understood that the operating modes described hereinbelow with respect to the hybrid drivetrain 700, 800, 900, 1000 may be adapted where necessary to utilize the architecture of each to operate in the all-electric mode (where applicable), the hybrid mode, the regeneration/braking mode, the charging mode, and the direct drive mode.

In embodiments of the all-electric mode, the primary clutch 710, 810, 910, 1010 is placed in a disengaged position, and the battery 728, 828, 928, 1028 serves as the only power source for the hybrid drivetrain 700, 800, 900, 1000 for the vehicle. In the all-electric mode, the hybrid tandem axle drive unit 706, 894, 996, 1098, the motor-generator 714, 814, 914, 1014, applies force to the hybrid drivetrain hybrid drivetrain 700, 800, 900, 1000, causing rotation of at least one of the drive axles 780, 786, 880, 886, 980, 986, 1080, 1086, depending on a position of the selection clutch 722, 822, 922, 1022 and a location of the motor-generator 714, 814, 914, 1014, propelling the vehicle. In response to communication from the controller 726, 826, 926, 1026, the primary clutch 710, 810, 910, 1010 is disengaged and the position of the selection clutch 722, 822, 922, 1022 is determined to operate the hybrid drivetrain 700, 800, 900, 1000 in the all-electric mode.

In the hybrid mode, the primary clutch 710, 810, 910, 1010 is placed in an engaged position, and the battery 728, 828, 928, 1028 and the power source 702, 802, 902, 1002 serve as a combined power source for the hybrid drivetrain 700, 800, 900, 1000: In the hybrid mode, the motor-generator 714, 814, 914, 1014, in addition to the power source 702, 802, 902, 1002, may apply force to the hybrid drivetrain 700, 800, 900, 1000 to propel the vehicle. When the motor-generator 714, 814, 914, 1014 and the power source 702, 802, 902, 1002 are used in the hybrid mode, the primary clutch 710, 810, 910, 1010 is placed in an engaged position, and the motor-generator 714, 814, 914, 1014 and the power source 702, 802, 902, 1002, in response to communication with the controller 726, 826, 926, 1026, apply force to the hybrid drivetrain 700, 800, 900, 1000, causing rotation of at least one of the drive axles 780, 786, 880, 886, 980, 986, 1080, 1086, depending on a position of the selection clutch 722, 822, 922, 1022 and a location of the motor-generator 714, 814, 914, 1014.

In the regeneration/braking mode, the motor-generator 714, 814, 914, 1014 is used to retard the hybrid drivetrain 700, 800, 900, 1000 for the vehicle to facilitate capturing kinetic energy of the vehicle as electrical power to be stored in the battery 728, 828, 928, 1028. The regeneration/braking mode may be used to assist a conventional braking system or may be used to regulate a speed of the vehicle when descending an incline. When the motor-generator 714, 814, 914, 1014 is used in the regeneration/braking mode, the selection clutch 722, 822, 922, 1022 is placed in a position to facilitate driving engagement between at least one of the drive axles 780, 786, 880, 886, 980, 986, 1080, 1086 and the motor-generator 714, 814, 914, 1014 and the primary clutch 710, 810, 910, 1010 may be placed in a disengaged condition (it is understood that engine braking using the power source 702, 802, 902, 1002 may or may not be used in addition to the regeneration/braking mode), and the motor-generator 714, 814, 914, 1014 retards the hybrid drivetrain 700, 800, 900, 1000 to capture kinetic energy as electrical power.

In embodiments of the charging mode, the power source 702, 802, 902, 1002 and the first motor-generator 714, 814, 914, 1014 are used to charge the battery 728, 828, 928, 1028. It is understood that the charging mode may be utilized when the vehicle is stationary (only applicable to the embodiment of the application shown in FIG. 7) or when the power source 702, 802, 902, 1002 is propelling the vehicle through the hybrid drivetrain 700, 800, 900, 1000. In the charging mode, the selection clutch 722, 822, 922, 022 is placed in a position to facilitate driving engagement between at least one of the drive axles 780, 786, 880, 886, 980, 986, 1080, 1086 and the motor-generator 714, 814, 914, 1014 and the primary clutch 710, 810, 910, 1010 is placed in an engaged condition, allowing the power source 702, 802, 902, 1002 and the motor-generator 714, 814, 914, 1014 to charge the battery 728, 828, 928, 1028.

In the direct drive mode, the motor-generator 714, 814, 914, 1014 is not used to propel the vehicle. It is understood that the direct drive mode may be utilized when a charge level of the battery 728, 828, 928, 1028 does not permit operation in the all-electric or hybrid modes. In the direct drive mode, the primary clutch 710, 810, 910, 1010 is placed in an engaged position and the selection clutch 722, 822, 922, 1022 is placed in a position to facilitate driving engagement between at least one of the drive axles 780, 786, 880, 886, 980, 986, 1080, 1086 and the transmission 704, 804, 904, 1004, and the power source 702, 802, 902, 1002 in response to communication with the controller 726, 826, 926, 1026, applies force (motor-generator 714, 814, 914, 1014, depending on the embodiment) to the hybrid drivetrain 700, 800, 900, 1000 to propel the vehicle. In accordance with the provisions of the patent statutes, the present application has been described in several embodiments, however, it should be noted that the application can be practiced otherwise than as specifically illustrated and described without departing from its scope or spirit.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for a hybrid vehicle comprising:
    in a dual-axle hybrid mode, driving a first axle and a second axle using a power source and at least one motor;
    in a direct drive mode, driving the first axle using the power source by transmitting power from the power source to a first motor of the at least one motor, from the first motor to a transmission, and from the transmission to the first axle, and selectively charging a battery with the first motor;
    in an electric mode, disengaging a clutch positioned between the power source and the first motor and driving one or more of the first axle and the second axle using the at least one motor;
    in a regeneration mode, retarding one or more of the first axle and the second axle using the at least one motor and charging the battery;
    in a charging mode, using the power source and the first motor to charge the battery; and
    driving the first axle using the power source and the first motor in a single axle hybrid mode.

2. The method of claim 1, wherein the at least one motor comprises a second motor, and the first axle and the second axle are operated independently of one another with the first motor and the second motor,
    when only the second motor is used to propel the vehicle, disengaging the clutch positioned between the power source and the first motor, and
    when the first motor and the second motor and the power source are used to propel the vehicle, engaging the clutch positioned between the power source and the first motor.

3. The method of claim 1, further comprising transferring power from the power source to the first axle via a planetary drive unit, and
    wherein the at least one motor is connected to an input shaft of the planetary drive unit.

4. The method of claim 1, further comprising transferring power from the power source to the first axle via a planetary drive unit,
    connecting the planetary drive unit and the first axle with an output shaft, and
    wherein the at least one motor drives and retards the output shaft.

5. The method of claim 1, further comprising transferring power from the power source to the first axle via a planetary drive unit, and
    wherein the at least one motor drives and retards a shaft connected to the second axle.

6. The method of claim 1, further comprising driving the first axle using the power source and driving the second axle using the at least one motor in a dual axle hybrid mode.

7. A method for a hybrid vehicle comprising:
    in a dual-axle hybrid mode, driving a first axle and a second axle using a power source and at least one motor;
    in a direct drive mode, driving the first axle via power transmitted from the power source to a first motor of the at least one motor, from the first motor to a transmission, and from the transmission to the first axle transmitting power, and selectively charging a battery using the first motor;

in an electric mode, driving one or more of the first axle and the second axle using the at least one motor, and disengaging a clutch coupling the power source to the first motor;

in a regeneration mode, retarding one or more of the first axle and the second axle using the at least one motor and charging the battery, and selectively engaging the clutch coupling the power source to the first motor to use the power source to brake the vehicle while retarding the second axle with a second motor of the at least one motor; and in a charging mode, using the power source and the first motor to charge the battery.

8. The method of claim 7, further comprising driving and retarding the first axle with the first motor, and driving and retarding the second axle independently of the first axle with the second motor.

9. The method of claim 7, further comprising transferring power from the power source to the first axle via a planetary drive unit, and in a single axle hybrid mode, disengaging the second axle, and driving the first axle using the power source and the at least one motor.

10. The method of claim 7, further comprising transferring power from the power source to the first axle via a planetary drive unit, driving and retarding an output shaft with the at least one motor, wherein the output shaft connects the planetary drive unit and the first axle, and driving the first axle with the at least one motor.

11. The method of claim 7, further comprising transferring power from the power source to the first axle via a planetary drive unit, and driving the second axle with the at least one motor while driving the first axle with the power source.

12. The method of claim 7, further comprising in a single axle hybrid mode:

driving the first axle using the power source and the at least one motor, and disengaging the second axle.

13. The method of claim 7, further comprising driving the first axle using the power source and driving the second axle the at least one motor in a dual axle hybrid mode.

14. A hybrid vehicle comprising:

a first axle and a second axle;

at least one motor;

a first motor of the at least one motor outputting power to a transmission and the transmission outputting power to the first axle;

a power source outputting power to the first motor and a clutch positioned between the power source and the first motor;

a battery; and a controller configured to send electrical communications to:

in a dual-axle hybrid mode, drive the first axle and the second axle using the power source and the at least one motor;

in a direct drive mode, engaging the clutch, driving one or more of the first axle and the second axle using the power source and transmitting power through the first motor, and selectively charging the battery using the first motor;

in an electric mode, drive one or more of the first axle and the second axle using the at least one motor and disengaging the clutch;

in a regeneration mode, retard one or more of the first axle and the second axle using the at least one motor, charging the battery with the at least one motor, and selectively engaging the clutch to use the power source to brake the vehicle; and in a charging mode, use the power source and the at least one motor to charge the battery.

\* \* \* \* \*